United States Patent [19]

Pruss et al.

[11] 4,243,684
[45] Jan. 6, 1981

[54] PREPARATION OF CHEESE WITH ROPY LACTIC ACID BACTERIA

[75] Inventors: Hans-Dieter Pruss, Cologne; Lütje-Wilhelm Bahrs, Halstenbek, both of Fed. Rep. of Germany

[73] Assignee: Lever Brothers Company, New York, N.Y.

[21] Appl. No.: 903,647

[22] Filed: May 4, 1978

Related U.S. Application Data

[63] Continuation of Ser. No. 806,964, Jun. 16, 1977, abandoned.

[30] Foreign Application Priority Data

Jun. 18, 1976 [GB] United Kingdom ............... 25342/76

[51] Int. Cl.³ ............................................. A23C 19/02
[52] U.S. Cl. ....................................... 426/40; 426/36; 426/43
[58] Field of Search .............................. 426/36, 40, 43

[56] References Cited

U.S. PATENT DOCUMENTS 3,914,435  10/1975  Maubois et al. ................... 426/36 X

OTHER PUBLICATIONS

Kosikowski, F. V., Cheesemaking by Ultrafiltration, J. Da. Sci. vol. 57, 1974 (pp. 488–491).
Webb et al., Fundamentals of Dairy Chemistry, The Avi Publ. Co., Inc., Westport, Conn. 1965 (pp. 734 and 735).

*Primary Examiner*—David M. Naff
*Attorney, Agent, or Firm*—Michael J. Kelly; James J. Farrell; Melvin H. Kurtz

[57] ABSTRACT

Cheese made from milk and/or milk-by-products concentrated by membrane filtration sometimes has the disadvantage of having a mealy and/or sandy texture. This can be overcome by using selected ropy cultures of lactic acid bacteria instead of the normal non-ropy cultures used for acidifying the milk product. The effect is particularly useful in the preparation of soft cheese having a smooth texture.

2 Claims, No Drawings

PREPARATION OF CHEESE WITH ROPY LACTIC ACID BACTERIA

This is a continuation of application Ser. No. 806,964, filed June 16, 1977, now abandoned.

The present invention relates to cheese and in particular to soft cheese such as Camembert, Brie, Romadur, Limburger and Muenster cheese, and to a process for the preparation of cheese.

A recent development in the production of cheese is the application of membrane filtration for concentrating milk and/or milk-by-products (see for example German patent applications Nos. 2,035,534 (INRA) and 2,417,926 (CLAUDEL S.A.)). A major advantage is that by means of membrane filtration the milk and/or milk-by-products can be concentrated to such a degree that after curdling no whey separation is required and consequently the whey proteins remain in the cheese. The curd produced by such a process can be converted into cheese, for example into a soft cheese of the Camembert type.

The Camembert-type cheese produced in Germany is generally made from pasteurised milk, whereas in France Camembert cheese is usually made from milk which is not pasteurised. In practice the French Camembert cheese has a smoother structure than its German analogue, which might be due to the pasteurisation treatment of the milk.

Sometimes Camembert-type cheese made from milk concentrated by membrane filtration has the disadvantage of having a somewhat mealy and/or sandy texture, which is not appreciated by consumers who are used to the quality of a normal smooth Camembert cheese.

It has now been found that a soft, ripened cheese having a smoother structure, thus more in the direction of French Camembert cheese, can be prepared from milk and/or milk-by-products concentrated by membrane filtration by using selected ropy cultures of lactic acid bacteria instead of the normal non-ropy cultures used for acidifying the milk. Both skim milk and whole milk can be used as well as partly skimmed milk. Examples of the normal non-ropy cultures are cultures used for the preparation of fresh cheese consisting of a mixed culture of Streptococcus lactis, Streptococcus cremoris, Leuconostoc citrovorum and Streptococcus diacetilactis, sold by several suppliers of dairy starter cultures.

Examples of suitable ropy cultures which can be used in a process according to the present invention are cultures of specific strains of Streptococcus lactis, Streptococcus cremoris and Streptococcus diacetilactis, which are usually found in Scandinavian ropy sour milks, which micro-organisms have the common characteristic of imparting a ropy structure to milk (see for example R. Forsén; Milchwissenschaft 18 (1963) 22-25; Der Einfluss der Mikroflora auf die Eigenschaften des finnischen Sauermilchgetränkes "Piima"; R. Forsén; Finnish J. Dairy Sci. 26 (1966) 10-76; Die Langmilch; and E. Wolfertstetter; Deutsche Milchwissenschaft Hildesheim (1969; Heft 30) 1473-1474; Langmilch- ein Produkt aus Lappland). In addition to the normal properties of the above-mentioned species of lactic streptococci, they form slimy material in various media, e.g. milk and whey. The ropiness of milk fermented by these organisms can be observed and determined by the following methods.

1. By observing the structure of the sour milk in comparison with sour milk fermented by normal cultures. The normal sour milk adheres to the wall of a glass beaker, whereas the ropy sour milk is cohesive in itself.

2. Another test can be made with the help of a pipette. The pipette is dipped into the sour milk, of which about 2 ml is sucked in, and subsequently the pipette pulled out of the sour milk. The ropy milk will form a thread between the pipette and the surface of the liquid, whereas the normal sour milk will not. When the liquid is released from the pipette, normal sour milk will form single drops just like water, whereas the ropy sour milk will form drops with long threads stretching to the tip of the pipette.

3. When a test tube filled to about one third of its height is stirred with a rotating stirrer, normal sour milk creeps up high to the inner wall whereas the ropy milk practically does not.

4. Lactodynamograms made by the method described by J. Thomasow in Milchwissenschaft 23 (1968) 725-731 show that the amplitude values determined for ropy milk are higher as compared with those for normal sour milk.

The following procedure for test 2 can be used to determine whether a specific culture is a ropy culture or a non-ropy one:

Micro-organisms were isolated from a Swedish sour milk "Langfil" and a starter culture of the organisms in skim milk was made. The ropiness of the starter cultures was tested by the quick pipette test. Those cultures whereby a thread having a length of at least 5 cm was formed when the pipette was pulled out from the surface of the culture were considered of sufficient ropiness.

It has further been found that these ropy cultures can be used advantageously in the preparation of other types of cheese, both ripened and non-ripened, when milk and/or milk-by-products concentrated by means of membrane filtration are used as a starting material.

Thus the present invention provides cheese as well as a process for its preparation in which (1) milk or a milk-by-product or a mixture thereof is subjected to a membrane filtration treatment to form a concentrate which is admixed with cream, if required to control the fat content of the final cheese, (2) the concentrate is admixed with a culture of lactic acid bacteria and optionally with rennet and/or with other micro-organisms used in cheese manufacture, after which the admixture is fermented until a pre-cheese is formed, and (3) the pre-cheese is converted into cheese by a selection of the usual steps such as cutting, cooking, whey separation if still necessary, washing, moulding, pressing, and ripening, depending on the type of cheese to be made, with the characterising feature that the concentrate obtained in step (1) is admixed with a ropy culture of lactic acid bacteria as hereinbefore defined. Preferably the concentrate is pasteurised before admixing with the ropy culture.

The invention provides in particular a process for preparing a soft, ripened cheese of the Camembert type, whereby milk containing from 0 to about 5% by weight of fat and/or milk-by-products are concentrated by membrane filtration, the concentrate is pasteurised and inoculated with a ropy culture of lactic acid bacteria and optionally with Penicillium caseicolum and admixed with rennet, after which the admixture is fermented to form a coagulum which is worked up to cheese, as known in the preparation of Camembert-type cheese.

In a preferred embodiment of the invention the admixture of pasteurised concentrate and ropy culture, and optionally rennet and other micro-organisms used in cheese manufacture, is filled with moulds until a coagulum has been formed, which is subsequently demoulded and converted into the desired type of cheese. An attractive alternative to the use of single moulds is a process in which the admixture is filled into tubes or tubelike plastic foils or tubes coated with foils and then fermented to form a firm coagulum within 5 to 16 hours. The sausage-like coagulum is then cut into discs of the dimension of the final cheese. Both the discs and the formed curd from the single moulds can be further converted into cheese in a conventional manner.

The fat content of the cheese can be controlled by mixing the concentrate or the coagulum with cream having a fat content of about 20 to 50% or by adapting the fat content of the starting milk.

The invention is illustrated by the following Examples and Comparative Experiments.

The general procedure used was as follows: Skim milk was pasteurised (e.g. 40 seconds at 74° C.) and subjected to membrane filtration at a temperature of between 10° and 15° C., whereby a concentrate was obtained having a dry matter content of about 20%. By the membrane filtration treatment most of the milk salts and lactose were removed. The concentrate was mixed with cream containing up to 50% fat in such an amount that the mixture had a fat-in-dry matter content of about 45%. The creamed concentrate having a dry matter content of 29,4% and a fat-in-dry matter content of 46,2% was pasteurised (5 minutes at 75° C.), cooled to 30° C. and inoculated with 2% starter culture and Penicillium caseicolum to a final concentration of $5 \times 10^3$ spores/ml milk and renneted with 23 ml rennet/100 l milk (rennet strength 1:10,000).

The mixture was filled into tube-like plastic foil having a diameter of 9 cm (made from Kalle-Nalophan).

The mixture soured and coagulated at room temperature within 20 hours. The coagulum had a pH of about 4.8–4.9. The amount of whey formed which was separated was in the order of 1–5%. The dry matter was about 28.1–29.6%. The sausage-like coagulum was cut into discs of about 3½ cm height which were given into an 18% salt bath containing $40 \times 10^3$ Penicillium caseicolum spores/ml. After 12 days' storage at 15° C. and 80 to 90% relative humidity the cheeses covered with a dense velvet mycelium were wrapped into aluminium foils and stored at 8° C.

In the Example according to the present invention a slime forming Streptococcus diacetilactis as described' before was used as starter culture. In the Comparative Experiments commercially available non-ropy cultures containing S.lactis, S.cremoris, L.citrovorum and S.diacetilactis from Flora Danica (Denmark) and from Wiesby (Federal Republic of Germany) were used.

Some illustrative data showing differences in behaviour are given below:

|  | Example I | Comparative Experiment Wiesby | Comparative Experiment Flora Danica |
|---|---|---|---|
| whey |  |  |  |
| pH | 4.98 | 4.86 | 4.85 |
| protein content | 1.01% | 2.24% | 2.37% |
| % of the curd | 1% | 5% | 3% |
| Curd |  |  |  |
| pH | 4.88 | 4.81 | 4.82 |
| dry matter | 28.51% | 28.10% | 29.57% |
| fat-in-dry matter | 43.14% | 44.48% | 43.96% |
| after salting |  |  |  |
| pH | 4.85 | 4.79 | 4.86 |
| dry matter | 29.50% | 30.29% | 31.87% |
| fat-in-dry matter | 44.07% | 46.22% | 45.50% |
| cheese after 12 days' storage |  |  |  |
| pH | 5.61 | 5.43 | discarded after 9 days' storage because of a yeast infection |
| dry matter | 38.51% | 41.46% |  |
| fat-in-dry matter | 49.26% | 50.65% |  |
| flavour | full taste | almost tasteless |  |
| texture | smooth | sandy |  |

The data show that when a ropy culture is used:
(1) less whey is formed which moreover has a lower protein content. Besides the economical advantage it is attractive that more of the valuable whey protein remains in the cheese;
(2) the cheese has a lower dry matter content and a lower fat-in-dry matter content, which might correlate with the observation that the cheese has a smoother texture.

Example II

Pasteurised whole milk with 4.0% fat and 3.4% protein content was concentrated by membrane filtration at a temperature between 12° C. and 32° C., whereby a concentrate was obtained having a dry matter content of 39.2% and a fat content of 20%. The concentrate was pasteurised (5 minutes at 75° C.) and then worked up as described in Example I, giving a cheese with a dry matter content of 51.3%, fat in dry matter content of 50,7% and a pH of 5.25 at the 11th day of storage. The flavour and taste was Camembert-like and the texture firm and smooth.

Although the invention has been illustrated for soft cheese of the Camembert type, it is also applicable for other types of soft cheese such as Brie, Romadur, Limburger and Muenster, as well as for other types of cheese where a smooth structure is important and a sandy texture is undesirable.

I claim:

1. In the process for preparing a soft cheese comprising the steps wherein:
   (a) milk, a milk-by-product, or a mixture thereof is subjected to a membrane filtration to form a concentrate;
   (b) said concentrate is admixed with a lactic acid bacteria culture;
   (c) said admixture is fermented until a precheese is formed; and
   (d) said precheese is converted into a soft cheese, the improvement comprising said lactic acid bacteria culture being a ropy culture having a thread length of at least 5 centimeters by the quick pipette test, wherein a pipette is dipped into a sour milk produced with said ropy culture, sour milk is sucked into said pipette and the pipette is pulled out from the surface of the sour milk to form said thread between the pipette and the surface of the sour milk.

2. The improved process according to claim 1 wherein said soft cheese is a camembert cheese.

* * * * *